United States Patent [19]

Hagquist et al.

[11] Patent Number: 5,556,934
[45] Date of Patent: Sep. 17, 1996

[54] ISOCYANURATE EMBEDMENT COMPOUND

[75] Inventors: James A. E. Hagquist, St. Paul; Kevin J. Reid, White Bear; Albert Giorgini, Maplewood; Nathanael Hill, Columbia Heights, all of Minn.

[73] Assignee: H. B. Fuller Licensing & Financing Inc., Arden Hills, Minn.

[21] Appl. No.: 308,783

[22] Filed: Sep. 19, 1994

Related U.S. Application Data

[63] Continuation-in-part of Ser. No. 116,346, Sep. 3, 1993, abandoned.

[51] Int. Cl.$^6$ .................................................. C08G 18/32
[52] U.S. Cl. ...................... 528/85; 528/52; 528/57; 15/193
[58] Field of Search ...................... 528/85, 57, 52; 15/193

[56] References Cited

U.S. PATENT DOCUMENTS

| | | | |
|---|---|---|---|
| 3,133,299 | 5/1964 | Danley et al. | 15/193 |
| 4,525,890 | 7/1985 | Peerman et al. | 15/193 |
| 4,602,049 | 7/1986 | Regelman . | |
| 4,788,262 | 11/1988 | Markusch et al. . | |
| 4,880,845 | 11/1989 | Moss et al. . | |
| 5,150,494 | 9/1992 | Wenzer | 15/193 |
| 5,189,068 | 2/1993 | Boehme et al. | 521/172 |

OTHER PUBLICATIONS

Abstract of (Basic) EP 495307; Dated Jul. 22, 1992.
Abstract of (Basic) EP 490026; Dated Jun. 17, 1992.
Abstract of (Basic) GB 2249792; Dated May 20, 1992.
Abstract of (Basic) EP 445837; Dated Sep. 11, 1991.
Abstract of (Basic) DE 3420923; Dated Dec. 5, 1985.
Abstract of (Basic) NL 8303152; Dated Apr. 01, 1985.

*Primary Examiner*—Nathan M. Nutter
*Assistant Examiner*—John M. Cooney, Jr.
*Attorney, Agent, or Firm*—Vidas, Arrett & Steinkraus

[57] ABSTRACT

A polyisocyanurate composition suitable for use as a paint-brush potting compound which does not foam at bristle interfaces, rapidly penetrates bristle bundles and cures rapidly to a highly solvent resistant embedment with good adhesion to both bristle and ferrule materials, comprises:

a polyisocyanate containing at least 18% by weight NCO content;

a polyol;

the polyisocyanate and polyol components being present in respective amounts so as to provide a NCO/OH ratio of between 2 and 4; and, an amount of catalyst effective to catalyze cure of the composition predominantly by formation of isocyanurate linkages without substantial gassing.

19 Claims, No Drawings

ISOCYANURATE EMBEDMENT COMPOUND

CROSS REFERENCE TO RELATED APPLICATIONS

This application is a Continuation-in-Part of U.S. patent application Ser. No. 08/116,348, filed Sep. 3, 1993, now abandoned.

BACKGROUND OF THE INVENTION

Paintbrushes are commonly manufactured by bundling bristles of natural or synthetic origin, inserting one end of the bundle into a ferrule containing the handle and then potting the end portion of the bristle bundle within the ferrule with a curable liquid embedment compound. Rubber based adhesives were once used but epoxy-based compositions have long been the materials of choice for this purpose. The epoxy resin systems are made by a variety of suppliers and have a number of advantages, including good to excellent solvent resistance, good adhesion to the metal ferrules and the various bristle materials, such as polyester, nylon, polyolefin, and natural hair bristles. Also epoxies give excellent bond strength and are available at relatively low cost. However, epoxies have some significant disadvantages. These include very long cure times (4 to 8 hours at room temperature) which creates long manufacturing cycles because uncured epoxies have little to no strength so that brushes can't be trimmed until cured. Further, to achieve adequate penetration into the aforementioned bristles, up to eight different epoxy formulations are needed with wide blend ratios, 6:1 up to 13:1 by volume are common. Deep penetration into the bristles is necessary to achieve good bond strength.

Recently there has been reported in U.S. Pat. No. 4,525,890 a polyurethane embedment compound which provides good solvent resistance due to a high crosslink density. The polyurethane embedment compounds used in this reference are said to significantly shorten the manufacturing cycle of a paintbrush because of their much shorter pot-lives. However, a particular disadvantage of polyurethanes, especially ones that are highly crosslinked, is that mix ratios must be carefully controlled to achieve the proper adhesion and physical properties. A deviation in either direction of the polyol or isocyanate component of up to five percent can have a significant detrimental effect on the adhesive's final properties.

A need therefore remains for a rapid curing alternative paintbrush embedment compound which has good solvent resistance and adhesion to bristle materials and which is not highly sensitive to mix ratio.

Polyisocyanurates are known to have good chemical resistance. However, formulations curing to polyisocyanurates typically foam readily, due to production of $CO_2$ as a byproduct of the cure reaction. Therefore, polyisocyanurates would be expected to be unsuitable as candidate paintbrush potting compounds since any foam at the bristle interface reduces adhesive bonding and reduces penetration of the compound into the bristles.

SUMMARY OF THE INVENTION

The invention disclosed herein is in one aspect a polyisocyanurate composition which is especially suitable for use as a paintbrush potting compound because it does not foam at bristle interfaces, rapidly penetrates bristle bundles and cures rapidly to a highly solvent resistant embedment with good adhesion to both bristle and ferrule materials. In a further aspect the invention comprises novel paintbrushes characterized by an embedment of a cured formulation of the invention.

The compositions of the invention comprise:
a polyisocyanate containing at least 18% by weight NCO content;
a polyol;
the polyisocyanate and polyol components being present in respective amounts so as to provide a NCO/OH ratio of between 2 and 4; and,
an amount of catalyst effective to catalyze cure of the composition predominantly by formation of isocyanurate linkages without substantial gassing.

The compositions may be easily formulated to have a convenient 1:1 by volume blend ratio which has a wide tolerance for error, up to 25%, with no loss in its physical performance properties or adhesion to paintbrush or paint roller substrates. This greatly reduces or eliminates the need to dispose of the finished products should the adhesive be accidently mixed in the wrong ratio.

The solvent resistance of the cured compositions to common paint solvents (i.e. petroleum distillates, toluene, methanol, isopropanol, ethanol, acetone, methyl ethyl ketone, propylene glycol and methylene chloride) is equivalent to and in many cases better than the previously mentioned systems. The compositions also have good to excellent adhesion to the metal ferrules and to the synthetic or natural hair bristles. Furthermore, deep bristle bundle penetration and excellent bristle bond strengths have been achieved without requiring a large variety of formulations thus allowing a reduction in the number of products customers must inventory. The preferred compositions gel in 25 to 30 seconds and cure in approximately five minutes at room temperature. Continued processing of the paintbrush is feasible within less than 30 minutes from application of the composition to the brush.

The present invention further provides a method of making a filter assembly using a composition of the present invention to pot a filter media in the filter assembly, and a filter assembly comprising a filter media potted therein with a potting compound, said potting compound being a composition of the present invention. The present invention is also useful as a thermal brake suitable for use in metal casing structures such as windows, door frames, and the like.

DETAILED DESCRIPTION OF THE INVENTION

The compositions of the invention are employed as two part formulations which are mixed at the time of use. One part of the composition comprises the polyisocyanate while the other part comprises the polyol, catalyst and, typically, such further property modifiers as are desired in the formulation.

The polyisocyanate component may comprise any compound which has at least two NCO groups per molecule, provided that the isocyanate component has at least 18% NCO and the initial blend viscosity of the isocyanate and polyol components at ambient temperature does not exceed about 3000 mPa.s. For the preferred 1:1 mix ratio formulations, the viscosity of the isocyanate component is preferably less than 500 mPa.s, more preferably less than 300 mPa.s. The minimum NCO content of the polyisocyanate is important to assure isocyanurate formation during cure. Preferably the NCO content is at least 23%, more preferably 27–35% by weight of the polyisocyanate component. Subject to these limitations and preferences, the polyisocyanate may suitably be aliphatic or aromatic, and may be a monomer or an oligomer material. Suitable examples include MDI (bis-methyleneisocyanate-biphenyl) monomer and oligomers and mixtures with higher functional polyisocyanates, toluene diisocyanate, isopherone diisocyanate, etc. Commercial products include Mondur ML (sold by Miles Inc.), Rubinate 1680 (sold by ICI Americas, Inc.), Isonate 2143L (sold by Dow Chemical Company), and the like.

The polyol component of the inventive compositions will have an average of more than two hydroxyl groups per molecule, preferably at least three groups per molecule. Particularly suitable polyols are polyether or polyester triols and tetraols, and mixtures thereof, which give good wetting and cured properties, such as Voranol 232-034 triol and Voranol 240-800 tetraol, both sold by Dow Chemical Company. The polyol component may also include minor amounts of mono and di functional alcohols as co-curable diluents or plasticizers, subject to the necessity for maintaining an average functionality in excess of 2. In order to provide a composition on mixing which has a low enough viscosity to allow for bristle penetrating or wetting prior to gelation, the viscosity of the polyol component will preferably not exceed about 4000 mPa.s and is more preferably in the range of 200–3500 mPa.s. By varying the cure speed of the system, however, viscosities outside the preferred range may also be employed.

To assure that the composition, when cured, will include substantial isocyanurate content the ratio of NCO to OH in the blended composition needs to be at least 2.0. If the NCO/OH ratio exceeds approximately 4.0, $CO_2$ is likely to be generated during cure, thereby causing undesirable foaming. Preferably the NCO/OH ratio in the final composition will be in the range of 2.0–3.5.

The mix ratio of the two parts of the composition is desirably 1:1, so as to minimize error in mixing. Furthermore, the composition, upon initial mixing should have a viscosity which is sufficiently low to allow good bristle wetting and bristle bundle penetration before gelation without being so low as to flow out of the ferrule prior to gelation. Desirably, therefore the initial viscosity of the blended formulation will be in the range of 300–4000, preferably, 1000–2500 mPa.s. To these ends the polyol and/or polyisocyanate portion of the composition may be filled, extended or diluted with common modifying agents. It is preferred that such modifying agents be hydrophobic, although hydrophilic modifiers may also be suitable. Fillers are desirably both hydrophobic and solvent resistant. A suitable diluent/plasticizer for the polyol portion is dinonylphenol. A suitable extender for the polyisocyanate which also aids in maintaining moisture resistance is castor oil. Flow control agents and hydrophobic silica thixotropes, such as Modaflow and Cabosil TS-720 may also be employed in small amounts. Those skilled in the art will understand that many other plasticizers, fillers, flow control agents and thixotropes may also be suitably employed as modifiers in the compositions of the invention.

To prevent foaming due to moisture reaction it is important to prepare the polyol part under rigorously anhydrous conditions, suitably using dried components, vacuum stripping after blending and storing under dry inert gas, such as dry nitrogen. Desirably the polyol component will also include a moisture scavenger. Particularly suitable moisture scavengers are molecular sieves 3A and 4A, which may be supplied in the form of a powder or in the form of a paste, such as Baylith L Paste sold by Miles Inc., which does not readily separate from the polyol component during storage.

The catalyst system is important for ambient cure. It must promote urethane formation (NCO/ROH reaction) and trimerization concurrently; while minimizing the foam formation ($NCO/H_2O$) reaction). The catalyst system should generate the highest exotherm possible during the initial gel/harding reaction for two reasons, first, to drive off moisture from the substrates and minimize post gel foaming from any residual water (the $NCO/H_2O$ reaction), second, maximize trimer formation to form a tough solvent resistance seal without the aid of heat to achieve a final cure of the adhesive. The catalyst system must not rapidly increase the adhesive's viscosity prior to gel, this assures good wetting and penetration of the substrate before curing but, the catalyst must be active enough to gel the adhesive in times of less than 60 seconds to prevent over penetration of the bristles.

Suitable catalysts are tertiary amines such as Polycat 41 (N, N, N', N', N", N"-hexamethyl-1,3,5-triazine 1,3,5 (2H, 4H, 6H) tripropanamine) and Polycat 43 (a proprietary tertiary amine), both sold by Air Products and Chemical, Inc. Various catalysts based on potassium salts of organic acids like, Dabco T-45 (Potassium Octonate in dipropylene glycol(DPG) (60/40)), and Dabco K-15 (Potassium Octonate in DPG (70/30)), or Polycat 46 (Potassium Acetate in Ethylene Glycol), and combinations of the above catalysts. A slower reacting trimer catalyst may also be used with a stronger trimer catalyst, therefore, combination of the above catalysts and Dabco TMR-2 and Dabco TMR-3 (both Quarternary Ammonium Salts), Dabco TMR-30, (2,4,6-tris(dimethylaminomethyl)phenol) all from Air Products can work in this application. Combinations of suitable strong trimer catalysts and a small amount of urethane catalysts, such as Dabco 33 LV (Triethylene diamine in DPG (33/67)) and a metal based catalyst like Dabco T-12 (Dibutyltin dilaurate), can also work in this application.

Catalyst activity is also affected by the quantity employed. Effective amounts will typically be in the range of about 0.5–5.0% by weight of the polyol component, preferably 2–3%. A particularly preferred catalyst is a 6:1–10:1 weight ratio mixture of Polycat 43 and Polycat 41, employed at a level of 2–3% by weight of the polyol component of the composition.

The catalyst or catalyst mixture most preferably is one which will produce an exotherm of at least 280° F.

The invention is illustrated by the following non-limiting examples.

EXAMPLE 1

The following ingredients(weight basis parts), as listed in Table 1, all containing less than 0.04% water, were charged into a double shafted mixer with vacuum capabilities:

TABLE 1

| | |
|---|---|
| Polyether triol | 61.95 |
| Polyether tetraol | 15.49 |
| Dinonylphenol | 9.90 |
| Moisture scavenger | 9.63 |
| Hydrophobic silica | 0.77 |
| Flow control agent | 0.01 |
| Polycat 43 catalyst | 2.00 |
| Polycat 41 triazine catalyst | 0.25 |

After blending for approximately 20 minutes the mixture was vacuum stripped, filtered and packaged under dry nitrogen. This polyol portion of the composition had a viscosity of approximately 2800 mPa.s. When mixed at a 1:1 volume ratio with Isonate® 2143L polyisocyanate (viscosity=33 mPa.s) the composition had a pot life of approximately 30 seconds, did not foam and gave good penetration of synthetic bristle materials. Even better penetration of synthetic bristle materials with similar pot-life and non-foaming properties were obtained when the polyisocyanate used was Mondur®ML polyisocyanate (mixture of 1,1'-methylenebis-isocyanatobenzene and 1,1'-methylenebis-4-isocyanatobenzene with 33.5% NCO and a viscosity of 10 mPa.s), also at a 1:1 volume ratio.

Using the same polyol component, a ferrule bound bundle of natural bristle fibers was effectively penetrated using a 30 second pot-life, substantially non-foaming composition prepared by mixing at 1:1 volume ratio a 27%, 120 mPa.s polyisocyanate obtained by extending Rubinate® 1680 with castor oil (94.3:5.7 weight ratio).

On curing, the resulting isocyanurates had an iso index between 2.3–2.7 and a hardness between 75 and 85 Shore D.

Paintbrushes embedded with the compositions of this example could trimmed in 15 to 20 minutes.

EXAMPLES 2–16

Formulations were prepared as follows:

| Raw Material | Formula Eq. Wt. | Percent |
| --- | --- | --- |
| Part: Polyol | | |
| Voranol 232-034 | 1650 | 78.40% |
| Voranol 240-800 | 70 | 19.60% |
| Catalyst | | 2.00% |
| | | 100.00% |
| Part B: Isocyanate | | |
| Rubinate 1820 | 131.3 | 100.00% |
| Polyol Blend Eq. Wt = 305.3 | | |
| Isocyanate Eq. Wt. = 131.3 | | |
| Mix Ratio by Wt(A/B) = 100:108 | | |
| NCO/OH Ratio = 2.5 | | |

Results to be measured:
1. Peak Exotherm
2. Solvent Resistance (% Weight gain/loss and Hardness)

Test Procedures

Peak Exotherm: Approximately 50 to 60 grams of material were mixed in a cup. A thermocouple was inserted into the cup while the material was still liquid and the highest measured temperature was recorded.

Solvent resistance: The initial and shore D hardness were recorded of a cured sample of the adhesive. The sample was then placed into a container of solvent (A Blend of Isopropyl Alcohol) and conditioned there for seven days. The samples were then removed from the solvent blend and allowed to air dry for one hour at room temperature. To remove any residual solvent the sample were then placed into a 160° oven for 4 hours. They were then allowed to cool to room temperature, after reaching RT the final weight and hardness were measured.

Catalysts and test results are listed in Table 2.

TABLE 2

| Example | Catalyst | Exotherm °F. | % Wt Change | Hardness(D)I/F |
| --- | --- | --- | --- | --- |
| 2 | 46 | 295° F. | 1.3001% | 82/80 Shore D |
| 3 | K-15 | 272° F. | 1.7478% | 78/73 Shore D |
| 4 | T-45 | 295° F. | 0.7945% | 74/75 Shore D |
| 5 | 41 & 43(1.5/0.5) | 284° F. | 3.4115% | 80/76 Shore D |
| 6 | 41 & 43(1.0/1.0) | 292° F. | 2.9701% | 83/82 Shore D |
| 7 | 41 & 43(0.5/1.5) | 299° F. | 3.4893% | 75/77 Shore D |
| 8 | 41 & K-15(1.5/0.5) | 285° F. | 4.0025% | 79/74 Shore D |
| 9 | 41 & K-15(1.0/1.0) | 295° F. | 3.3371% | 78/77 Shore D |
| 10 | 41 & K-15(1.0/1.0) | 301° F. | 2.7841% | 75/74 Shore D |
| 11 | 43 & K-15(1.5/0.5) | 299° F. | 3.0508% | 74/72 Shore D |
| 12 | 43 & K-15(1.0/1.0) | 303° F. | 2.7610% | 62/59 Shore D |
| 13 | 43 & K-15(0.5/1.5) | 301° F. | 2.7593% | 69/65 Shore D |
| 14 | 43 & 46 (1.5/0.5) | 300° F. | 3.3290% | 77/75 Shore D |
| 15 | 43 & 46 (1.0/1.0) | 284° F. | 3.1263% | 70/68 Shore D |
| 16 | 43 & 46 (0.5/1.5) | 298° F. | 2.9755% | 70/73 Shore D |

The catalysts set forth in Table 2 above are Polycat 41 ("41"), Polycat 43 ("43"), Polycat 46 ("46"), Dabco K-15 ("K-15"), Dabco T-45 ("T-45"), and various combinations thereof.

The formulation as set forth below is suitable for use as a thermal brake composition for use in structures, for instance, as disclosed in copending application Ser. No. 08/072,248 filed Jun. 7, 1993, incorporated herein by reference.

EXAMPLE 17

| | |
| --- | --- |
| Triol (Voranol 232-034) | 53% |
| Triol (Voranol 230-238) | 32% |
| Quadrol (Voranol 240-770) | 14.54% |
| Potassium (Dabco T-45, Dabco K-15 or Polycat 46) | 0.23% |
| Triazine Catalyst (Polycat 41) | 0.23% |

Those skilled in the art will recognize that the formulations of the invention may be advantageous in applications other than paint brush embedments. In particular, the formulations may be used in the manufacture of filters, for instance as a potting compound for fiber bundles in hollow fiber filters, or for bonding or embedment of filter media in automobile filters or the like. Thus, the present invention also includes both a method of making a filter assembly comprising using a composition as set forth hereinabove to pot a filter media in the filter assembly, and a filter assembly comprising a filter media potted therein with a potting compound, the potting compound being a composition as set forth hereinabove.

Potting of optical fiber bundles in optical fiber cable assemblies is another application in which the compositions may have use.

What is claimed is:

1. A composition curable to a polyurethane/polyisocyanurate comprising:

a polyisocyanate containing at least 18% by weight NCO content;

a polyol having an average of more than 2 hydroxyl groups per molecule; the polyisocyanate and polyol components being present in respective amounts so as to provide a NCO/OH ratio of between 2 and 4; and, an amount of catalyst effective to catalyze cure of the composition by generation of both urethane and isocyanurate linkages, without substantial gassing, the catalyst being chosen from the group consisting of potassium salts, mixtures of potassium salts, tertiary or quaternary amines, triazine compounds and N,N,N',N',N",N"-hexamethyl-1,3,5-triazine 1,3,5 (2H, 4H, 6H)tripropanamine.

2. A composition as in claim 1 wherein the polyisocyanate has an NCO content of at least 23%.

3. A composition as in claim 2 wherein the NCO content of the polyisocyanate is between 27% and 35%.

4. A composition as in claim 1 wherein the polyol is a triol or tetraol.

5. A composition as in claim 1 wherein the NCO/OH ratio is 2.0–3.5.

6. A composition as in claim 1 wherein the catalyst comprises a potassium salt based catalyst.

7. A composition as in claim 6 wherein the catalyst further comprises a tertiary amine having at least three amine nitrogen atoms.

8. A composition as in claim 1 wherein said catalyst is a triazine compound.

9. A composition as in claim 1 further comprising a moisture scavenger.

10. A two part composition as in claim 1 the first part comprising said polyisocyanate and having a viscosity at 25° C. in the range of 5–300 mPa.s and the second part comprising said polyol and catalyst components and having a viscosity in the range of 200–3000 mPa.s..

11. A composition as in claim 10 having a gel time after mixing said two parts at a 1:1 volume ratio of less than 1 minute.

12. A composition as in claim 10 having a viscosity immediately after mixing said two parts in a 1:1 volume ratio at 25° C. of less than about 3000 mPa.s.

13. A paintbrush comprising a bristle bundle in a ferrule potted with a cured composition as in claim 1.

14. A method of making a paintbrush comprising using a composition as in claim 1 to pot a bristle bundle in a ferrule attached to a handle.

15. A method of making a filter assembly comprising using a composition as in claim 1 to pot a filter media in the filter assembly.

16. A filter assembly comprising a filter media potted therein with a potting compound, the potting compound being a composition as in claim 1.

17. A composition as in claim 1 wherein the catalyst is present in an amount effective to produce an exotherm of at least 250° F.

18. A composition as in claim 1 wherein said catalyst is selected to produce an exotherm of at least 280° C.

19. A metal casing for a window, door frame or the like, the casing having a thermal brake comprising a cured composition as in claim 1.

* * * * *

UNITED STATES PATENT AND TRADEMARK OFFICE
CERTIFICATE OF CORRECTION

PATENT NO. : 5,556,934
DATED : Sept. 17, 1996
INVENTOR(S) : JAMES A. E. HAGQUIST ET AL It is certified that error appears in the above-indentified patent and that said Letters Patent is hereby corrected as shown below:

Col. 8, line, 26, delete "C" and insert -- "F" --

Signed and Sealed this

Twenty-fourth Day of December, 1996

Attest:

BRUCE LEHMAN

*Attesting Officer*          *Commissioner of Patents and Trademarks*